United States Patent
Lin et al.

(10) Patent No.: US 7,519,260 B1
(45) Date of Patent: Apr. 14, 2009

(54) COAXIAL OPTOELECTRONIC DEVICE SEPARATION APPARATUS AND METHOD

(75) Inventors: Kai-Sheng Lin, Sugar Land, TX (US); Chung-Yung Wang, Sugar Land, TX (US); Hung-Lun Chang, Sugar Land, TX (US); Limin Chen, Houston, TX (US); Chian-Hung Chen, Sugar Land, TX (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 9 days.

(21) Appl. No.: 11/966,064

(22) Filed: Dec. 28, 2007

(51) Int. Cl.
*G02B 6/00* (2006.01)
(52) U.S. Cl. ...................... 385/136; 385/137
(58) Field of Classification Search .......... 385/134–137
See application file for complete search history.

(56) References Cited

U.S. PATENT DOCUMENTS

| | | | | |
|---|---|---|---|---|
| 4,247,163 A | * | 1/1981 | Lumpp et al. | 385/136 |
| 4,448,481 A | * | 5/1984 | Basov et al. | 385/136 |
| 5,677,975 A | * | 10/1997 | Burek et al. | 385/136 |
| 6,754,416 B1 | * | 6/2004 | Mitchell et al. | 385/37 |

* cited by examiner

*Primary Examiner*—Sung H Pak
*Assistant Examiner*—Daniel Petkovsek
(74) *Attorney, Agent, or Firm*—N. Stephan Kinsella; Grossman, Tucker, Perreault & Pfleger, PLLC

(57) ABSTRACT

An optoelectronic device separation apparatus may include a first and second clamp members configured to grip coaxial portions of an optoelectronic device. In one embodiment, the clamp members grip a housing portion and a fiber pigtail portion, respectively. The clamp members are configured to rotate relative to each other about an axis that is generally coaxial with the axis of the coaxial portions of the optoelectronic device. A force may be applied to the clamp members to provide such rotation, thereby causing the coaxial portions of the optoelectronic device to separate, for example, along weld points coupling the portions of the optoelectronic device together. Of course, many alternatives, variations and modifications are possible without departing from this embodiment.

9 Claims, 3 Drawing Sheets

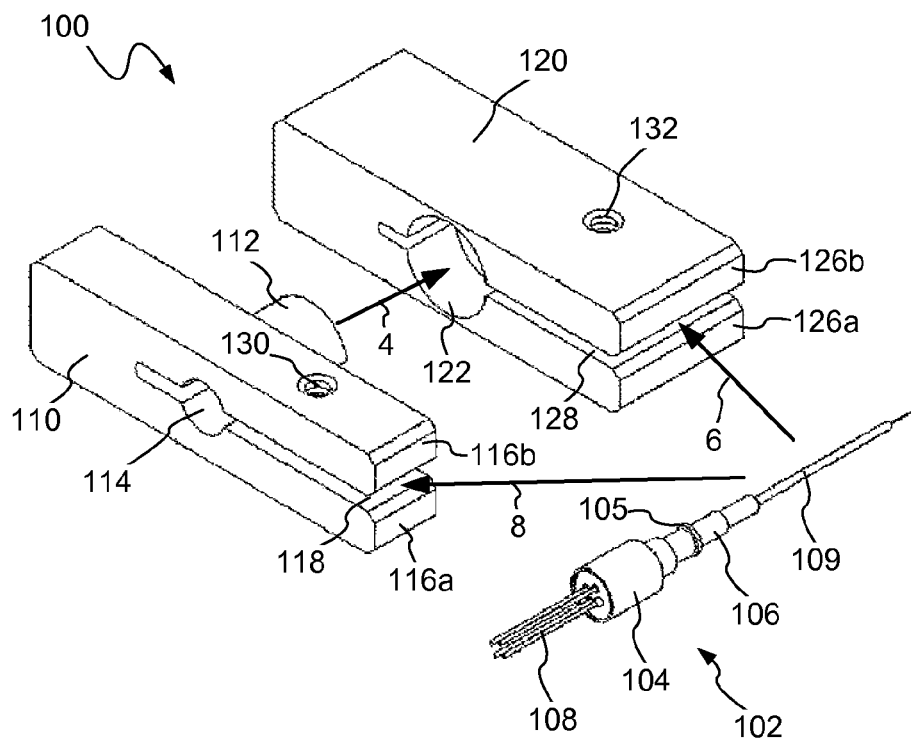
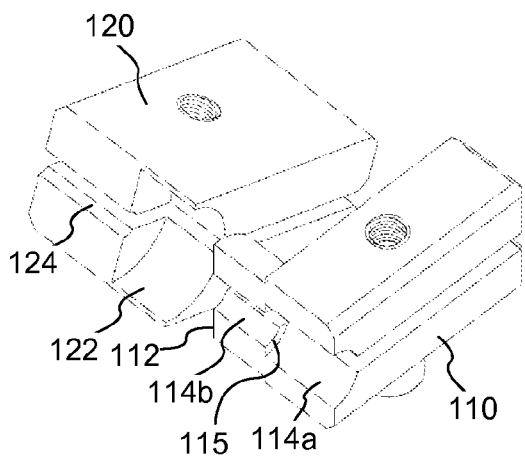
FIG. 2A
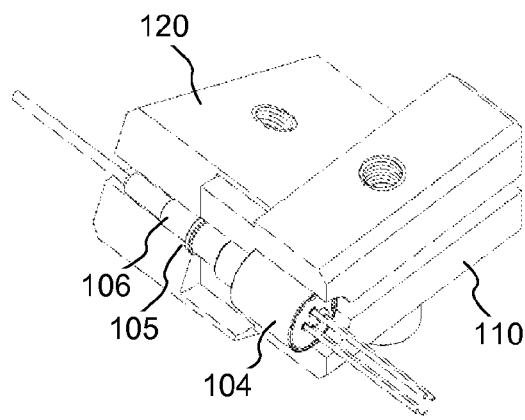
FIG. 2B

US 7,519,260 B1

COAXIAL OPTOELECTRONIC DEVICE SEPARATION APPARATUS AND METHOD

TECHNICAL FIELD

The present disclosure relates to optoelectronic packaging and in particular, to an apparatus and method for separating coaxial portions of an optoelectronic device.

BACKGROUND INFORMATION

The following descriptions and examples are not admitted to be prior art by virtue of their inclusion within this section.

In optical fiber communications systems, a transmitter may include a semiconductor laser (e.g., a laser diode) that generates the modulated digital or analog optical signal, which is optically coupled into one end (input or light-receiving end) of an optical fiber. At the other end of the fiber (output or light-transmitting end), a receiver may receive the optical signals. The receiver may include a photodetector optically coupled to the fiber to generate an electrical signal in response to the optical signal impinging thereon.

Various modules, assemblies or packages may be used to hold the laser and/or photodetector and other optical components (such as collimation and coupling lenses, isolators, and the like). The optical fiber is coupled to the package such that the fiber is aligned with and optically coupled to the laser and/or photodetector. The process of aligning an optical fiber with an optoelectronic package, such as a laser diode package, and fixing it in place is sometimes known as fiber pigtailing.

An optoelectronic package may include a housing portion (e.g., containing the laser and/or photodetector) and a fiber pigtail portion that connects the fiber to the housing portion. In some packages, such as a TO (transistor outline) can type package, the housing portion and the fiber pigtail portion are generally coaxial. For example, the fiber end may be disposed in a pigtail portion including a rigid cylindrical ferrule, which is itself mounted inside a cylindrical ferrule housing. The pigtail portion may also include an isolator. A TO can housing may include a substantially cylindrical portion having a lens disposed in an opening in the top portion thereof, which can be disposed between the laser and the fiber end. The fiber ferrule housing is mounted to the TO can housing. During the last stage of a coaxial packaging process, for example, the pigtail portion (i.e., the fiber ferrule) may be welded to the TO can.

Subsequently, during testing, it may be determined that some of the assembled optoelectronic devices may be defective (e.g., the lasers may be defective). If the pigtail portion cannot be separated from the housing portion containing the defective component, the entire assembly, including the pigtail isolators, usually is discarded. Some attempts have been made at separating the pigtail portion from the housing portion using conventional tools (e.g., using pliers); however, the use of such conventional techniques tends to ruin the isolator, for example, by breaking the magnetic ring in the isolator. Thus, the conventional techniques generally prevent the pigtail portions including the isolators from being reused after they are coupled to housings containing defective components.

BRIEF DESCRIPTION OF THE DRAWINGS

These and other features and advantages will be better understood by reading the following detailed description, taken together with the drawings wherein:

FIG. 1 is a perspective view of a separation apparatus and an optoelectronic device having a laser diode housing in accordance with an exemplary embodiment of the present disclosure;

FIG. 2A is a cross-sectional view of the separation apparatus shown in FIG. 1 in an unassembled position;

FIG. 2A is a cross-sectional view of the separation apparatus shown in FIG. 1 in an assembled position with the optoelectronic device clamped therein;

DETAILED DESCRIPTION

Figure 3:
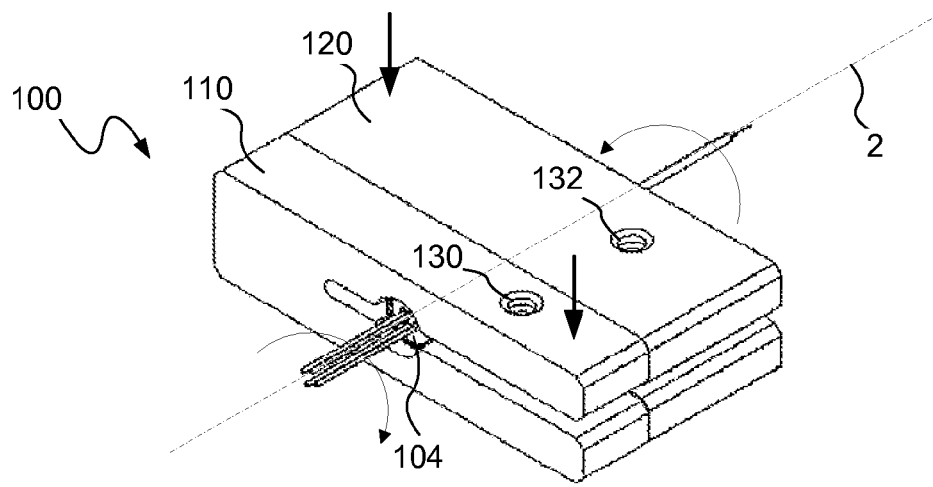
FIG. 3 is a perspective view of the separation apparatus shown in FIG. 1 having the optoelectronic device located therein.

An optoelectronic device separation apparatus is used to separate coaxial portions of an optoelectronic device. The optoelectronic device separation apparatus may be used, for example, to separate a fiber pigtail portion from a housing portion of the optoelectronic device along the weld points that secure the pigtail portion to the housing portion. Examples of optoelectronic devices that may be separated using the separation apparatus include a laser package, a photodetector package, and other devices including coaxial portions that are welded or similarly coupled together.

Referring to FIG. 1, an optoelectronic separation apparatus 100, consistent with an embodiment of the present disclosure, is configured to receive an optoelectronic device 102, such as a pigtail-coupled laser housing. The separation apparatus 100 includes a first clamp member 110 configured to grip a housing portion 104 of the optoelectronic device 102 and a second clamp member 120 configured to grip a fiber pigtail portion 106 of the optoelectronic device 102. The housing portion 102 may be welded to the pigtail portion 106 along a weld portion 105 such that the housing portion 102 and the pigtail portion 106 are generally coaxial.

One example of the optoelectronic device 102 is a TO can laser package including a laser diode (LD) housing portion 104 including leads 108 extending from the housing portion 104. The pigtail portion 106 may include one or more ferrules coupled to the LD housing portion 104 and to an optical fiber 109. The pigtail portion 106 may also include an isolator (not shown) located within one of the ferrules.

Referring also to FIGS. 2A and 2B, the first clamp member 110 may include a protruding cylindrical portion 112 and defines a first receiving region 114 that receives the housing portion 104. The first receiving region 114 may be formed by a through hole extending through the first clamp member 110 and the cylindrical portion 112. The first receiving region 114 may include different receiving region sections 114a, 114b having different inner diameters corresponding to the different outer diameters of the housing portion 104. In particular, the inner diameters are slightly larger than the corresponding outer diameters of the housing portion 104 to allow the housing portion 104 to be inserted into the first receiving region 114. The different diameters may help to position the optoelectronic device 102 in the appropriate location within the apparatus 100. For example, the larger diameter section of the housing portion 104 may abut a shoulder 115 within the first receiving region 114 when the optoelectronic device 102 is fully inserted (FIG. 2B).

The second clamp member 120 defines a recessed cylindrical portion 122 in the second clamp member 120 and a second receiving region 124 that receives the pigtail portion 106. The recessed cylindrical portion 122 and the second receiving region 124 may be formed by a through hole extending through the second clamp member 120. The recessed cylindrical portion 122 has a diameter slightly larger than the outer diameter of the protruding cylindrical portion 112 such that the protruding cylindrical portion 112 may be positioned in and rotate relative to the recessed cylindrical portion 122. When the protruding cylindrical portion 112 is inserted into the recessed cylindrical portion 122, the first receiving region 114 and the second receiving region 124 are generally coaxial and configured to receive the respective coaxial portions 104, 106 of the optoelectronic device 102. The second receiving region 124 may have a diameter smaller than the diameter of the recessed cylindrical portion 122 and corresponding to the outer diameter of the pigtail portion 106. In particular, the diameter of the second receiving region 124 is slightly larger than the outer diameter of the pigtail portion 106 to allow the pigtail portion 106 to be inserted into the second receiving region 124 (FIG. 2B).

Although the exemplary separation apparatus 100 includes receiving regions 114, 124 of a particular shape and dimension, the receiving regions within the clamp members 110, 120 may have other shapes and dimensions suitable for other types of optoelectronic devices having other shapes and dimensions.

The first clamp member 110 and second clamp member 120 may be formed by split end portions that clamp against the respective housing portion 104 and pigtail portion 106. The first clamp member 110 may include split end portions 116a, 116b separated by a slot 118. The slot 118 may extend through the first receiving region 114 such that the split end portions 116a, 116b move together to reduce the diameter of the first receiving region 114, thereby applying a force against the housing portion 104 located in the first receiving region 114. Similarly, the second clamp member 120 may include split end portions 126a, 126b separated by a slot 128. The slot 128 may extend through the recessed cylindrical portion 122 and the second receiving region 124 such that the split end portions 126a, 126b move together to reduce the diameter of the second receiving region 124, thereby applying a force against the pigtail portion 106 located in the second receiving region 124.

Threaded fasteners 130, 132 may be threadably received in the respective split end portions 116a, 116b of the first clamp member 110 and the split end portions 126a, 126b of the second clamp member 120. The threaded fasteners 130, 132 may be tightened to cause the split end portions 116a, 116b, 126a, 126b to be drawn together, thereby selectively reducing the inner diameter of the receiving regions 114, 124. The threaded fasteners 130, 132 may be loosened to cause the split end portions 116a, 116b, 126a, 126b to be forced apart, thereby selectively expanding the inner diameter of the receiving regions 114, 124. The clamp members 110, 120 may thus adjustably grip respective portions 104, 106 of various sizes by adjusting the threaded fasteners 130, 132. In one embodiment, the threaded fasteners 130, 132 are screws that are threaded into threaded screw-holes bored orthogonally through the split ends. Other tightening mechanisms may also be used to adjustably tighten the clamp members 110, 120.

In one embodiment, the clamp members 110, 120 may be machined or constructed out of a rigid material such as aluminum. The clamp members 110, 120 may also be constructed out a variety of different materials, including, but not limited to metallic, polymeric, and ceramic materials. Of course, other materials may also be used to construct any of the components associated with separation apparatus 100.

Figure 4:
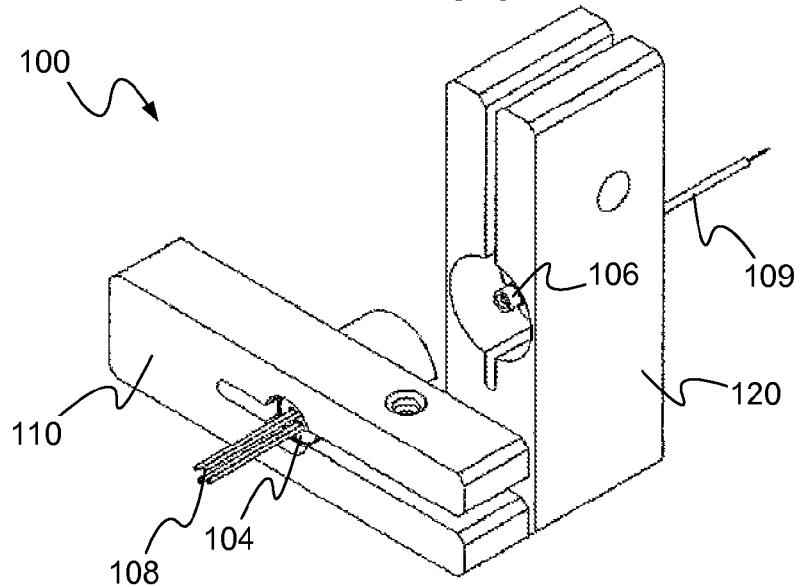
FIG. 4 is a perspective view of the separation apparatus of FIG. 1 after separation.
Figure 5:
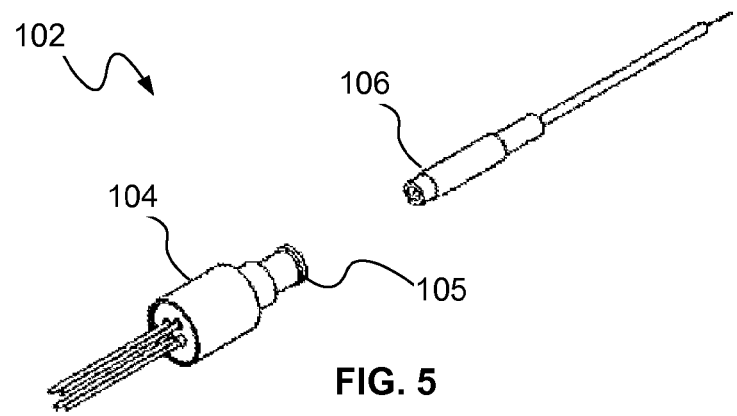
FIG. 5 is a perspective view of the optoelectronic device shown in FIG. 1 after separation and after being removed from the separation apparatus.

Referring further to FIGS. 3-5, operation of the separation apparatus 100 is described in greater detail. The separation apparatus 100 may be assembled by inserting the protruding cylindrical portion 112 into the recessed cylindrical portion 122, as indicated by arrow 4, and aligning the slots 118, 128 in the clamp members 110, 120. The optoelectronic device 102 may be inserted into the clamp members 110, 120 while the clamp members 110, 120 are assembled together. In particular, the fiber 109 may be passed through the slots 118, 128 in the housing clamp member 110 and the pigtail clamp member 120, as indicated by the arrows 6, 8. The fiber 109 may also be passed through the slots 118, 128 in the clamp members 110, 120 before the clamp members 110, 120 are assembled. The optoelectronic device 102 may then be inserted, pigtail portion 106 first, through the through-hole in the clamp member 110 until the pigtail portion 106 is located in the second receiving region 124 and the housing portion 104 is located in the first receiving region 114. When the portions 104, 106 are properly located within the respective clamp members 110, 120, the weld portion 105 (or other coupling point) may be located at the interface between the clamp members 110, 120, as shown in FIG. 2B.

The clamp members 110, 120 may then be tightened to grip against the respective housing portion 104 and pigtail portion 106, for example, by tightening the threaded fasteners 130, 132. The force applied by the clamp members 110, 120 should be sufficient to secure the portions 104, 106 without causing significant damage to those components that may be reused (e.g., without damaging the isolator in the pigtail portion 106). When the housing portion 104 and the pigtail portion 106 are gripped within the assembled separation apparatus 100 (FIG. 3), the coaxial housing portion 104 and pigtail portion 106 may generally be aligned with the axis 2 of the protruding cylindrical portion 112 engaging the recessed cylindrical portion 122.

After the portions 104, 106 of the optoelectronic device 102 have been secured within the clamp members 110, 120, a force may be applied at opposite ends of one or both of the clamp members 110, 120 to cause twisting relative to each other (FIG. 3). This applies tangential trim power to the welding points and separates the housing portion 104 from the fiber pigtail portion 106, while avoiding damage to pigtail isolator 130, optical fiber and/or other components. When the force is sufficient to break the weld points between the housing portion 104 and the pigtail portion 106, the portions 104, 106 will separate and the clamp members 110, 120 will rotate relative to each other. In particular, the protruding cylindrical portion 112 will rotate within the recessed cylindrical portion 122 about the axis 2. The clamp members 110, 120 may then be separated (FIG. 4) and the separated housing portion 104 and the pigtail portion 106 may be removed from the respective clamp members 110, 120 (FIG. 5).

Figure 6:
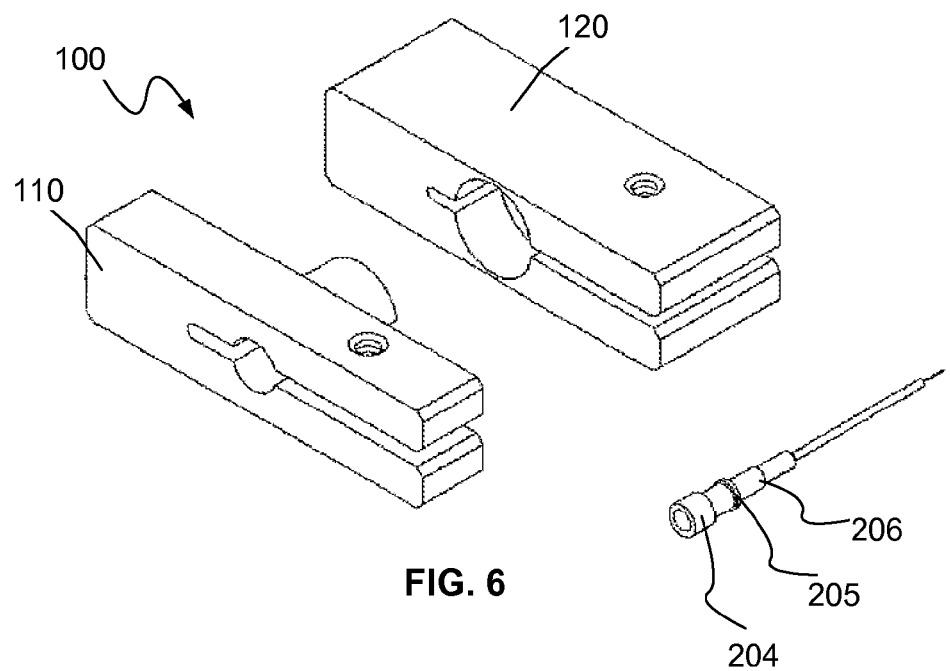
FIG. 6 is a perspective view of a separation apparatus and an optoelectronic device having a fiber housing in accordance with another exemplary embodiment of the present disclosure.
Figure 7:
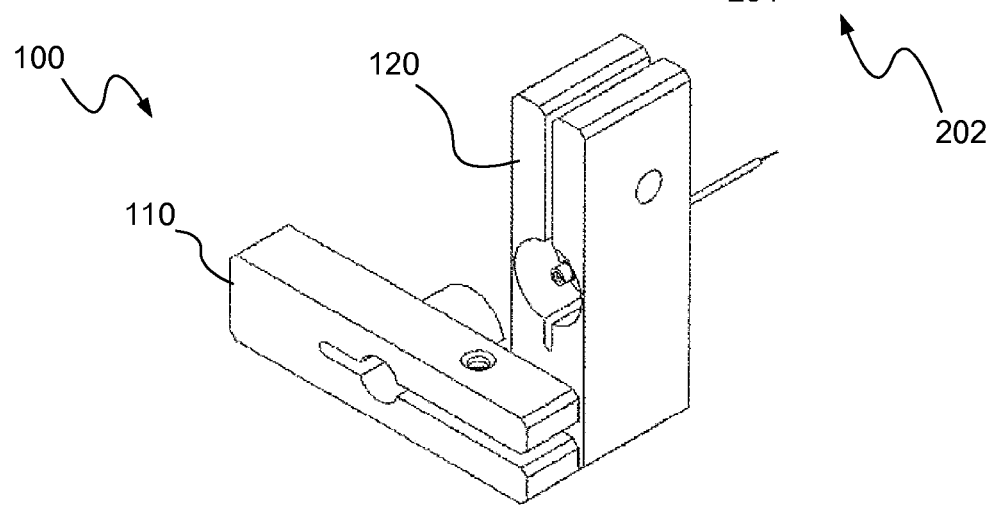
FIG. 7 is a perspective view of the separation apparatus gripping the optoelectronic device of FIG. 6 after separation.
Figure 8:
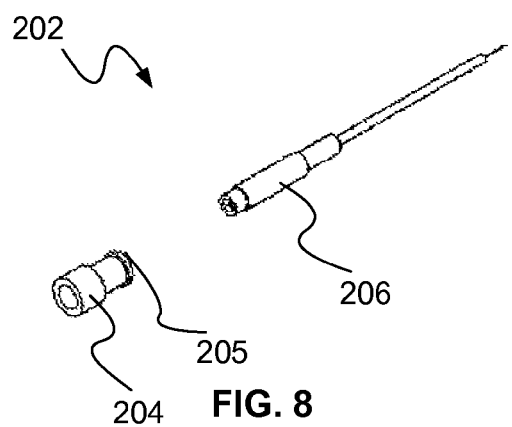
FIG. 8 is a perspective view of the detached optoelectronic device of FIG. 6 after separation and after being removed from the separation apparatus.

Referring now to FIGS. 6-8, the separation apparatus 100 may also be used to separate an optoelectronic device 202 having a fiber housing portion 204 coupled to a pigtail portion 206. This type of optoelectronic device 202 may be inserted into the clamp members 110, 120 in the same manner described above. The separation apparatus 100 may then separate the fiber housing portion 204 from the pigtail portion 206 along the weld points or portion 205, for example, in the same manner as described above.

Accordingly, the separation apparatus described herein may be used with a variety of different optoelectronic devices to separate a defective portion (e.g., a housing including a defective optoelectronic component) from a pigtail portion. The separation apparatus prevents damage to the pigtail portion and components contained therein (e.g., the isolator magnetic ring), allowing the pigtail portion to be reused and thereby reducing waste and costs. As described herein, apparatus 100 may be used with different types of optoelectronic devices including, but not limited to, an optoelectronic device 102 including a laser housing portion 104 (e.g., a TO can laser housing) as shown in FIGS. 1-5 and an optoelectronic device 202 including a fiber housing portion 204 as shown in FIGS. 6-8.

Consistent with one embodiment, a optoelectronic device separation apparatus is provided for separating coaxial portions of an optoelectronic device. The separation apparatus includes a first clamp member configured to grip a first coaxial portion of the optoelectronic device. The first clamp member defines a first receiving region configured to receive the first coaxial portion of the optoelectronic device. The first clamp member further includes a protruding cylindrical portion. At least a portion of the first receiving region is located within the protruding cylindrical portion. The separation apparatus further includes a second clamp member configured to engage the first clamp member and configured to grip a second coaxial portion of the optoelectronic device. The second clamp member defines a second receiving region configured to receive the second coaxial portion and defines a recessed cylindrical portion configured to receive the protruding cylindrical portion of the first clamp member such that the first receiving region and the second receiving region are coaxial when the protruding cylindrical portion is received in the recessed cylindrical portion. The second clamp member and the first clamp member are rotatable relative to each other around an axis of the protruding cylindrical portion received in the recessed cylindrical portion to separate the first coaxial portion from the second coaxial portion of the optoelectronic device.

Consistent with another embodiment, a method is provided for separating a housing portion of an optoelectronic device from a fiber pigtail portion of the optoelectronic device. The method includes engaging a first clamp member with a second clamp member such that the first clamp member and the second clamp member are rotatable relative to each other. The first clamp member and the second clamp member define a first receiving region and a second receiving region, respectively. The first receiving region and the second receiving region are coaxial when the first clamp member and the second clamp member are engaged. The method further includes inserting an optoelectronic device into the receiving regions defined by the first clamp member and the second clamp member such that a housing portion of the optoelectronic device is positioned within the first clamp member and a fiber pigtail portion of the optoelectronic device is positioned within the second clamp member. The housing portion of the optoelectronic device is gripped within the first clamp member, and the fiber pigtail portion of the optoelectronic device is gripped within the second clamp member. The method includes rotating at least one of the first clamp member and the second clamp member relative to each other and about an axis substantially coaxial with the optoelectronic device to separate the housing portion from the fiber pigtail portion of the optoelectronic device.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. An optoelectronic device separation apparatus for separating coaxial portions of an optoelectronic device, the apparatus comprising:

a first clamp member configured to grip a first coaxial portion of the optoelectronic device, the first clamp member defining a first receiving region configured to receive the first coaxial portion of the optoelectronic device, the first clamp member further including a protruding cylindrical portion, wherein at least a portion of the first receiving region is located within the protruding cylindrical portion; and a second clamp member configured to engage the first clamp member and configured to grip a second coaxial portion of the optoelectronic device, the second clamp member defining a second receiving region configured to receive the second coaxial portion and defining a recessed cylindrical portion configured to receive the protruding cylindrical portion of the housing clamp member such that the first receiving region and the second receiving region are coaxial when the protruding cylindrical portion is received in the recessed cylindrical portion, and wherein the first clamp member and the second clamp member are rotatable relative to each other around an axis of the protruding cylindrical portion received in the recessed cylindrical portion to separate the first coaxial portion from the second coaxial portion of the optoelectronic device.

2. The optoelectronic device separation apparatus of claim 1, wherein the first clamp member includes split end portions separated by a slot such that the split end portions apply a force against the first coaxial portion of the optoelectronic device to grip the first coaxial portion.

3. The optoelectronic device separation apparatus of claim 1, wherein the second clamp member includes split end portions separated by a slot such that the split end portions apply a force against the second coaxial portion of the optoelectronic device to grip the second coaxial portion.

4. The optoelectronic device separation apparatus of claim 2, further comprising at least one threaded fastener threadably engaging the split end portions of the first clamp member to adjustably grip the first coaxial portion of the optoelectronic device.

5. The optoelectronic device separation apparatus of claim 3, further comprising at least one threaded fastener threadably engaging the split end portions of the second clamp member to adjustably grip the second coaxial portion of the optoelectronic device.

6. The optoelectronic device separation apparatus of claim 1, wherein the first clamp member includes split end portions separated by a slot such that the split end portions apply a force against the first coaxial portion of the optoelectronic device to grip the first coaxial portion, and wherein the second clamp member includes split end portions separated by a slot such that the split end portions apply a force against the second coaxial portion of the optoelectronic device to grip the second coaxial portion.

7. The optoelectronic device separation apparatus of claim 6, further comprising at least one threaded fastener threadably engaging the split end portions of the first clamp member to adjustably grip the first coaxial portion and at least one threaded fastener threadably engaging the split end portions of the second clamp member to adjustably grip the second coaxial portion.

8. The optoelectronic device separation apparatus of claim 1, wherein the first clamp member defines a through-hole extending through the first clamp member, at least a portion of the through-hole forming the first receiving region.

9. The optoelectronic device separation apparatus of claim 1, wherein the second clamp member defines a through-hole extending through the second clamp member, at least a portion of the through-hole forming the second receiving region and the recessed cylindrical portion, and wherein the second receiving region has a smaller diameter than the recessed cylindrical portion.

* * * * *